United States Patent
Chen et al.

(10) Patent No.: US 9,537,778 B2
(45) Date of Patent: Jan. 3, 2017

(54) TRAFFIC SHAPING DRIVE METHOD AND DRIVER

(71) Applicant: ZTE Corporation, Shenzhen, Guangdong (CN)

(72) Inventors: Feixiong Chen, Shenzhen (CN); Qingji Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/893,183

(22) PCT Filed: Aug. 20, 2013

(86) PCT No.: PCT/CN2013/081910
§ 371 (c)(1),
(2) Date: Nov. 23, 2015

(87) PCT Pub. No.: WO2013/189390
PCT Pub. Date: Dec. 27, 2013

(65) Prior Publication Data
US 2016/0105367 A1    Apr. 14, 2016

(30) Foreign Application Priority Data
May 24, 2013   (CN) .......................... 2013 1 0196297

(51) Int. Cl.
*H04J 1/16*      (2006.01)
*H04L 12/815*   (2013.01)
(Continued)

(52) U.S. Cl.
CPC ............. *H04L 47/22* (2013.01); *H04L 5/0055* (2013.01); *H04L 47/12* (2013.01)

(58) Field of Classification Search
CPC ........ H04L 1/1848; H04L 69/16; H04W 80/06
See application file for complete search history.

(56) References Cited

U.S. PATENT DOCUMENTS 6,215,769 B1 *   4/2001   Ghani ................... H04L 1/1809
                                                              370/230
7,389,336 B2     6/2008   Sethi
(Continued)

FOREIGN PATENT DOCUMENTS

CN    101340268 A    1/2009
CN    102118298 A    7/2011
(Continued)

OTHER PUBLICATIONS

Supplementary European Search Report in European application No. 13807196.4, mailed on Mar. 22, 2016.
(Continued)

*Primary Examiner* — Melanie Jagannathan
(74) *Attorney, Agent, or Firm* — Oppedahl Patent Law Firm LLC

(57) ABSTRACT

A traffic shaping drive method and a driver are described. The method includes that: when traffic shaping is executed, timing time is set, and a data packet in a cache queue is sent at a preset constant rate in the timing time; when the timing time is reached, sending the data packet is stopped, and sending an ACK acknowledgement packet in the cache queue is started; and after the ACK acknowledgement packet is sent, returning to execute the traffic shaping. By conducting the traffic shaping on a drive layer, the disclosure enables the data packet to be sent at the constant rate, and reserves a certain bandwidth to send the ACK acknowledgement packet in time, thereby avoiding network congestion caused by delayed sending of the ACK acknowledgement packet, and improving the user experience.

8 Claims, 3 Drawing Sheets

(51) Int. Cl.
*H04L 5/00* (2006.01)
*H04L 12/801* (2013.01)

(56) References Cited

U.S. PATENT DOCUMENTS

| | | | | |
|---|---|---|---|---|
| 2003/0012212 A1* | 1/2003 | Earnshaw | ............. | H04L 1/1621 370/428 |
| 2003/0223370 A1* | 12/2003 | Jain | ......................... | H04L 47/10 370/235 |
| 2004/0148387 A1 | 7/2004 | Sethi | | |
| 2006/0176862 A1* | 8/2006 | Ishimori | ............... | H04L 1/1848 370/338 |
| 2007/0286077 A1 | 12/2007 | Wu | | |
| 2008/0089250 A1* | 4/2008 | Jung | ..................... | H04L 1/0028 370/276 |
| 2011/0103379 A1* | 5/2011 | Kim | ..................... | H04L 1/1664 370/389 |

FOREIGN PATENT DOCUMENTS

| | | |
|---|---|---|
| EP | 1441474 A2 | 7/2004 |
| WO | 2007141643 A1 | 12/2007 |

OTHER PUBLICATIONS

International Search Report in international application No. PCT/CN2013/081910, mailed on Feb. 27, 2014.
English Translation of the Written Opinion of the International Search Authority in international application No. PCT/CN2013/081910, mailed on Feb. 27, 2014.

* cited by examiner

TRAFFIC SHAPING DRIVE METHOD AND DRIVER

TECHNICAL FIELD

The disclosure relates to the technical field of communications, and in particular to a traffic shaping drive method and a driver.

BACKGROUND

In a Transmission Control Protocol/Internet Protocol (TCP/IP) transmission process, before new data is sent each time, it is needed to acknowledge whether the other side has received previous data, namely an ACK acknowledgement packet. However, in case of delay or low transmission rate, these ACK acknowledgement packets will be forced to delay to reach the destination. At this point, a data sending side has to waste a certain period of time to wait for receiving these ACK acknowledgement packets. Especially for a user of Digital Subscriber Line (DSL) and cable connection, when an uploading speed reaches a certain degree, uplink data is likely to slow or a downloading speed is obviously reduced, which is more serious especially for the user having a low uplink rate. This is because as an uplink is occupied completely, the acknowledgment of data will be delayed because of congestion of these uplink data.

With the development of a wireless terminal, e.g., a 4G wireless terminal, because its bandwidth is relatively wide, for making better use of bandwidths of uplink and downlink channels, a ratio of its bandwidths of uplink and downlink channels is usually greater than 1:2, even 1:9. So, when there is no any traffic shaping measure in the whole communication link, the downlink ACK acknowledge packet must be delayed, thereby the downlink channel is congested. FIG. 1 is a diagram of congestion of a downlink channel; as shown in FIG. 1, S101 is a downlink channel, and data types are: a data packet sent from a server normally and an uplink ACK acknowledge packet; S102 is an uplink channel, and data types are: a data packet sent from a client normally and a downlink ACK acknowledge packet. The two channels S101 and S102 are parallel; in the TCP/IP transmission process, before the new data is sent each time, it is needed to acknowledge whether the other side has received the previous data, so when the uplink channel reaches the limit of traffic capacity, namely there are more data packets to be sent in a buffer, a sending bandwidth cannot be provided for a new downlink ACK acknowledge packet, and then the data packets in the downlink channel will wait until a downlink ACK acknowledgement packet is received, thereby network congestion is caused.

The above situations can be collectively called a network with asymmetric uplink and downlink bandwidths. So far, in the general case, it is enabled to send more data once without need of immediate acknowledgement by increasing the capacity of TCP data packet. The main problem at the point is that: such a modifying way will cause a Ping value to stay at a high level (which causes a network lag phenomenon, commonly known as Lag), which is likely to cause serious consequences for the user browsing the Web, especially the user playing online games. For the data packet in which a TCP packet size is 512 k, it is so abnormal if the lag approaches 2 seconds. Generally speaking, only increasing the capacity of the TCP data packet cannot make the downloading speed reach a limit value of the bandwidth, and the situation that the sending of the ACK acknowledgement packet is delayed will not be improved better.

SUMMARY

The disclosure provides a traffic shaping drive method and a driver, for solving the problem in the related art that network congestion is caused by delayed sending of an ACK acknowledgement packet.

According to an aspect of the disclosure, a traffic shaping drive method is provided, which includes that:

when traffic shaping is executed, timing time is set, and a data packet in a cache queue is sent at a preset constant rate in the timing time; when the timing time is reached, sending the data packet is stopped, and sending an ACK acknowledgement packet in the cache queue is started; and after the ACK acknowledgement packet is sent, returning to execute the traffic shaping.

Optionally, the method of the disclosure may also include that:

when executing the traffic shaping is enabled, an average sending rate $\overline{V}$ of a data sending channel in a period of time which is from a previous specified time point to a current moment is detected, when the $\overline{V}$ approaches or is greater than or equal to a preset traffic shaping decision threshold $V_T$, the traffic shaping is executed, and the traffic shaping is enabled.

Optionally, in the method of the disclosure, the sending the data packet in the cache queue at the preset constant rate in the timing time may include that:

a data packet sending threshold $V'_T$ is set, the $V'_T$ is converted into a number of tokens, and based on the number of tokens, the data packet is sent according to a token bucket algorithm in the timing time to realize the sending data packet at the constant rate; wherein, $V'_T > V_T$.

Optionally, in the method of the disclosure, when the timing time is reached, the method may also include that: an actual average sending rate $\overline{V}'$ of the data sending channel in this timing time is detected, a ratio of the $\overline{V}'$ to the $V'_T$ is calculated, the $V'_T$ is adjusted in a direction that the ratio approaches 1 according to a set adjusting rule, and the adjusted $V'_T$ is regarded as a basis for setting the constant rate in next timing time.

Optionally, the method of the disclosure may also include that: when it is detected that the ratio of the actual average sending rate $\overline{V}'$ to the $V'_T$ is in a set interval range, a traffic shaping function is disabled; wherein the set interval range is a range approaching 1.

According to another aspect of the disclosure, a driver is provided, which includes:

a traffic shaping module, which is configured, when the traffic shaping is executed, to set timing time, and to send a data packet in a cache queue at a preset constant rate in the timing time, and when the timing time is reached, to stop sending the data packet, and to start to send an ACK acknowledgement packet in the cache queue; and an iteration module, which is configured, after the ACK acknowledgement packet is sent, to continue to trigger the traffic shaping module.

Optionally, the driver of the disclosure may also include:

a traffic shaping enabling module, which is configured to call a Quality of Service (QoS) module to detect an average sending rate $\overline{V}$ of a data sending channel in a period of time which is from a previous specified time point to a current moment, when the $\overline{V}$ approaches or is greater than or equal to a preset traffic shaping decision threshold $V_T$, to enable the traffic shaping module, and to enable the traffic shaping.

Optionally, in the driver of the disclosure, the traffic shaping module may be further configured to set a data packet sending threshold $V'_T$, to convert the $V'_T$ into a number of tokens, and based on the number of tokens, to send the data packet according to a token bucket algorithm in the timing time to realize the sending data packet at the constant rate; wherein, $V'_T > V_T$.

Optionally, in the driver of the disclosure, the traffic shaping module may be further configured, when the timing time is reached, to call the QoS module to detect an actual average sending rate $\overline{V}^t$ of the data sending channel in this timing time, to calculate a ratio of the $\overline{V}^t$ to the $V'_T$, to adjust the $V'_T$ in a direction that the ratio approaches 1 according to a set adjusting rule, and to regard the adjusted $V'_T$ as a basis for setting the constant rate in next timing time.

Optionally, the driver of the disclosure may also include: a traffic shaping disabling module, which is configured, when it is detected that the ratio of the actual average sending rate $\overline{V}^t$ to the $V'_T$ is in a set interval range, to disable a traffic shaping function; wherein the set interval range is a range approaching 1.

The beneficial effects of the disclosure are as follows:

firstly, by conducting the traffic shaping on a drive layer, the disclosure enables the data packet to be sent at the constant rate, and reserves a certain bandwidth to send the ACK acknowledgement packet in time, thereby avoiding network congestion caused by delayed sending of the ACK acknowledgement packet, and improving the user experience;

secondly, considering that conducting the traffic shaping must limit the threshold of the corresponding bandwidth of the data sending channel, the disclosure also provides a solution of adaptively matching the threshold of the channel bandwidth; compared with the fixed threshold, this adaptively matching solution makes maximum use of the bandwidth of the data sending channel, enables a data packet sending speed to reach the limit of the bandwidth, and further improves the user experience.

DETAILED DESCRIPTION

For solving the problem in the related art that network congestion is caused by delayed sending of an ACK acknowledgement packet, the disclosure provides a traffic shaping drive method and a driver; on one hand, the method sends an uplink data packet at a constant speed in a certain period of time, and reserves a certain bandwidth to send a downlink ACK acknowledgement packet in time, avoiding the delayed sending of the ACK acknowledgement packet; on the other hand, an adaptive matching solution is presented, which implements the adaptive traffic shaping, and enables a data packet sending speed to reach the limit of the bandwidth. The implementation process of the disclosure is elaborated in detail through a few specific embodiments.

Embodiment 1

The embodiment provides a traffic shaping drive method, which is applied to any situation that network congestion is caused by delayed sending of an ACK acknowledgement packet; at present, the congestion of this situation mainly exists in a network with asymmetric uplink and downlink bandwidths, for example, a ratio of bandwidths of uplink and downlink channels is 1:2, even 1:9; at this point, the delayed sending of the downlink ACK acknowledgement packet in an uplink channel is very likely to happen, which causes downlink congestion. So, to be able to elaborate the disclosure clearly, the following elaboration is given by taking conducting the traffic shaping to an uplink data sending channel for example, and implementations of other situations refer to the following way.

Figure 1:
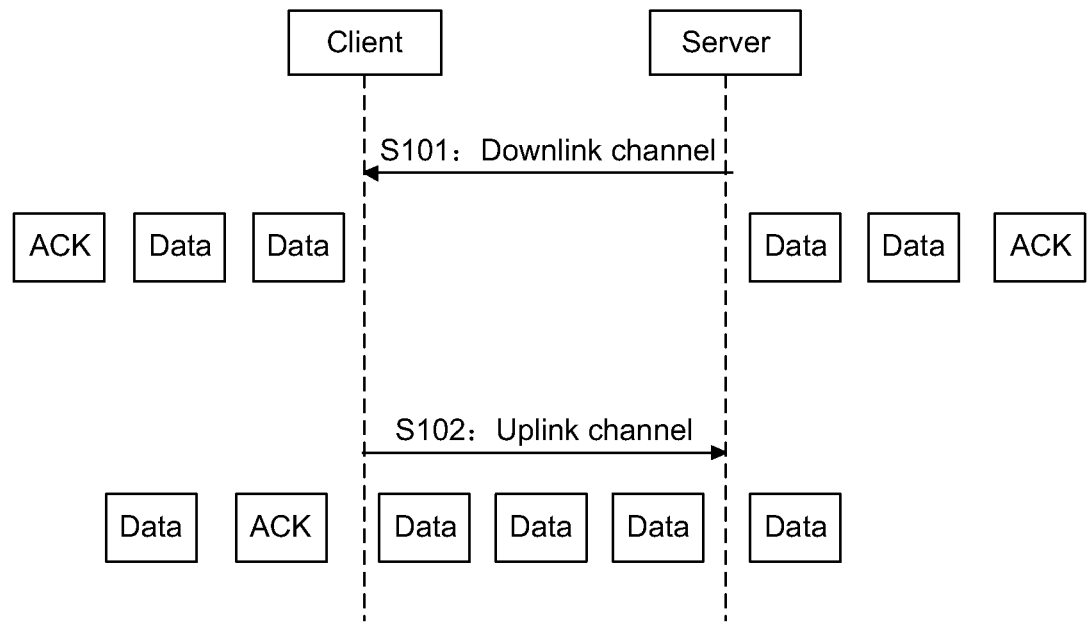
FIG. 1 is a diagram of congestion of a downlink channel in the related art.
Figure 2:
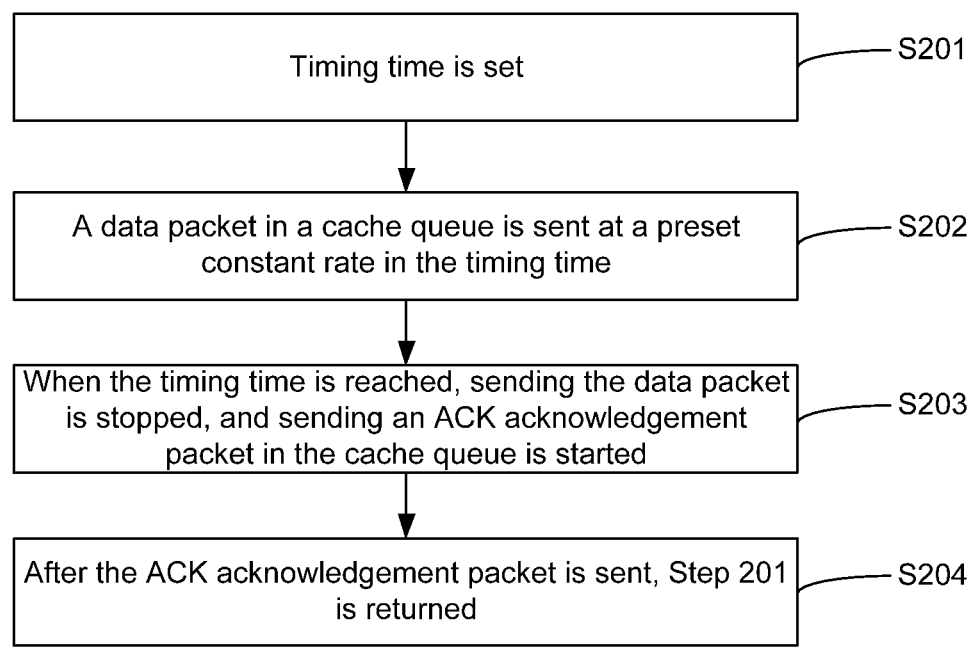
FIG. 2 is a flowchart of a traffic shaping drive method provided by an embodiment 1 of the disclosure.

As shown in FIG. 2, the method of the embodiment includes the following steps.

Step 201: timing time is set;

preferably, before this step, a constraint for needing to conduct the traffic shaping is added, that is, the process of traffic shaping is not always implemented; specifically, step 200 is added before step 201: an average sending rate $\overline{V}$ of an uplink channel in a period of time which is from a certain previous time point to a current moment is detected, when the $\overline{V}$ approaches or is greater than or equal to a preset traffic shaping decision threshold $V_T$, step 201 is executed, the traffic shaping is started; otherwise, a data packet and an ACK acknowledgement packet are processed in a normal data processing way;

wherein, the $\overline{V}$ approaching the traffic shaping decision threshold $V_T$ means that $\overline{V}$ approaches but does not reach the threshold $V_T$, and the user can set the degree of approaching flexibly according to requirements, for example, setting $\overline{V}=(0.95\sim1)V_T$ as approach. Furthermore, the set decision threshold $V_T$ should be less than the maximum bandwidth of the uplink channel; preferably, the $V_T$ is equal to 0.4~0.6 times of the maximum bandwidth of the uplink channel.

Step 202: a data packet in a cache queue is sent at a preset constant rate in the timing time; preferably, this step is implemented in the following way:

setting a data packet sending threshold $V'_T$, converting the $V'_T$ into a number of tokens, and based on the number of tokens, sending the data packet according to a token bucket algorithm in the timing time to realize the sending the data packet at the constant rate, wherein, $V'_T > V_T$.

Step 203: when the timing time is reached, sending the data packet is stopped, and sending an ACK acknowledgement packet in the cache queue is started.

Step 204: after the ACK acknowledgement packet is sent, step 201 is returned.

Figure 3:
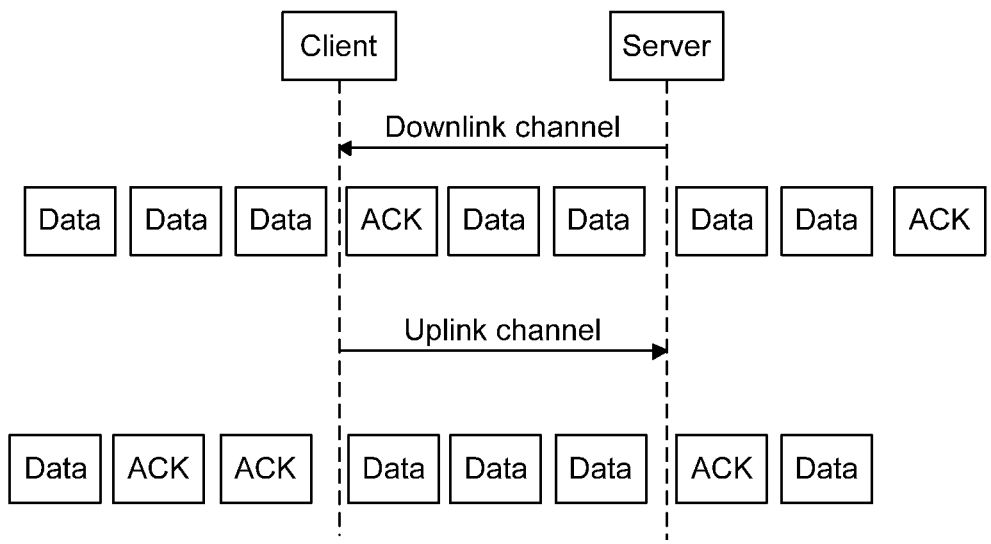
FIG. 3 is a diagram of a downlink channel after the processing of traffic shaping.

After the processing of traffic shaping, a comparatively ideal sending situation of the data packet and the ACK acknowledgement packet can be achieved, as shown in FIG. 3 specifically.

To sum up, this embodiment of the disclosure considers that the network congestion is caused because the downlink ACK acknowledgement packet is delayed in case of the network with asymmetric uplink and downlink bandwidths. So, it is necessary to limit a sending rate of the uplink channel, and reserve a certain bandwidth to send the downlink ACK acknowledgement packet. In this way, a bandwidth utilization ratio of the downlink channel is ensured not to be influenced while ensuring a high enough bandwidth utilization ratio of the uplink channel.

Embodiment 2

Figure 4:
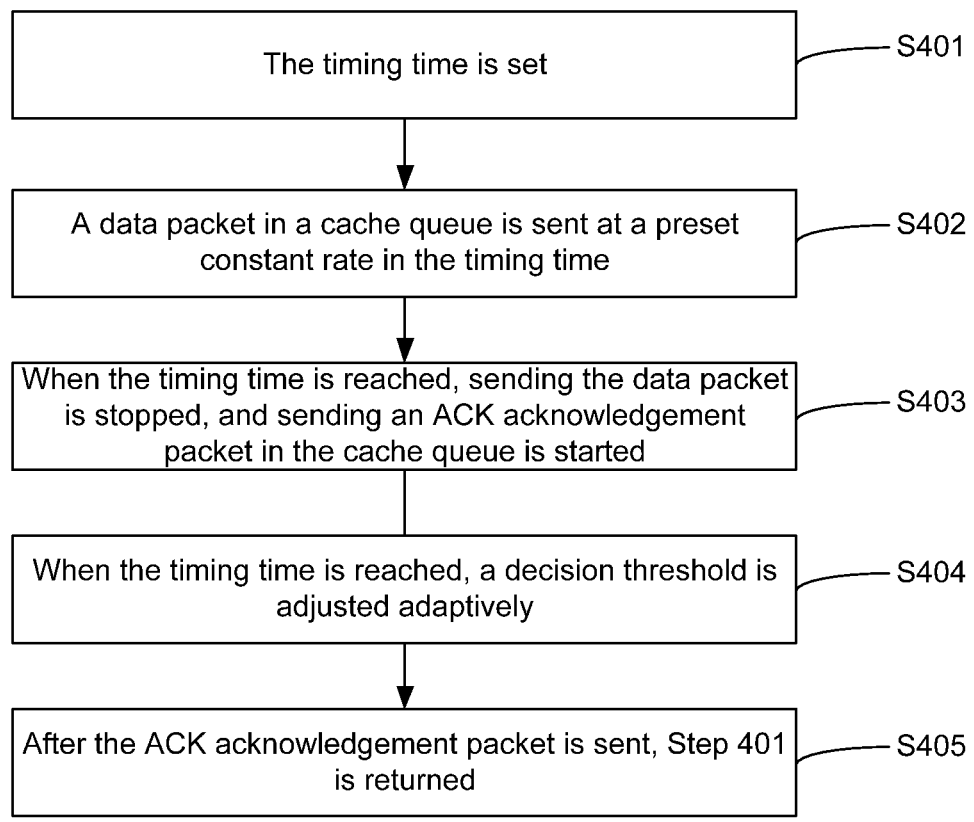
FIG. 4 is a flowchart of a traffic shaping drive method provided by an embodiment 2 of the disclosure.

The embodiment provides a traffic shaping drive method, exactly an adaptive traffic shaping drive method; the method includes all steps of the embodiment 1, and further expands the implementation process of the embodiment 1. This embodiment is still elaborated by taking conducting the traffic shaping to an uplink data sending channel for example; as shown in FIG. 4, the method includes the following steps.

Step 401: timing time is set.

Step 402: a data packet in a cache queue is sent at a preset constant rate in the timing time; the specific implementation way of this step is:

setting a data packet sending threshold $V'_T$, converting the $V'_T$ into a number of tokens, and based on the number of tokens, sending the data packet according to a token bucket algorithm in the timing time to realize the sending the data packet at the constant rate, wherein, $V'_T > V_T$.

Step 403: when the timing time is reached, sending the data packet is stopped, and sending an ACK acknowledgement packet in the cache queue is started.

Step 404: when the timing time is reached, a data packet sending threshold $V'_T$ is adjusted adaptively;

the specific implementation process of this step is: when the timing time is reached, detecting an actual average sending rate $\overline{V'}$ of a data sending channel in this timing time, calculating a ratio of the $\overline{V'}$ to the $V'_T$, adjusting the $V'_T$ in a direction that the ratio approaches 1 according to a set adjusting rule, and regarding the adjusted $V'_T$ as a basis for setting the constant rate in the next timing time.

Note that, step 404 and s403 are parallel implementation processes, although they are described through steps 403 and 404, they are not in a sequential execution relationship.

Step 405: after the ACK acknowledgement packet is sent, step 401 is returned, and the traffic shaping function is disabled until it is detected that a ratio of the actual average sending rate $\overline{V'}$ to the $V'_T$ is in a set interval range, wherein the set interval range is a range approaching 1.

To sum up, this embodiment of the disclosure considers that the network congestion is caused because the downlink ACK acknowledgement packet is delayed in case of the network with asymmetric uplink and downlink bandwidths. So, it is necessary to limit the sending rate of the uplink channel, and reserve a certain bandwidth to send the downlink ACK acknowledgement packet. In this way, the bandwidth utilization ratio of the downlink channel is ensured not to be influenced while ensuring a high enough bandwidth utilization ratio of the uplink channel. In addition, an uplink rate threshold is adaptively matched, and a best uplink rate threshold can be obtained after multiple matching processes, thereby making maximum use of the bandwidth of the uplink channel, and enabling the data packet sending speed to reach the limit of bandwidth.

Embodiment 3

Figure 5:
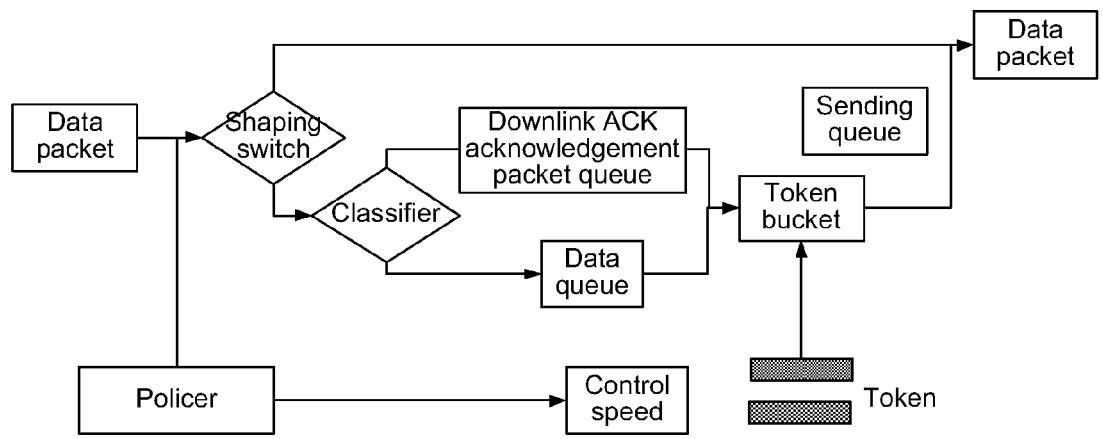
FIG. 5 is a diagram of adaptive traffic shaping in an embodiment 3 of the disclosure.

The embodiment provides a traffic shaping drive method, exactly an adaptive traffic shaping drive method; this embodiment is a specific implementation way of the method in the embodiment 2, and this embodiment elaborates the process of adaptively controlling the traffic shaping based on the theory of traffic shaping; FIG. 5 is a diagram of adaptive traffic shaping.

The traffic shaping drive method of this embodiment includes the following steps.

Step 1: a policer calls a QoS module to collect current actual sending rates of uplink and the downlink channels in real time, namely occupied bandwidths.

Step 2: the policer detects average sending rates of the uplink and downlink channels in a period of time (this time range can be set randomly) which is from a certain previous time point to a current moment.

Step 3: the policer detects whether an average sending rate of a bandwidth of the uplink channel approaches or is greater than or equal to a preset traffic shaping decision threshold; if so, it is determined that traffic shaping is needed, and step 5 is executed; otherwise, it is determined that the traffic shaping is not needed, and step 4 is executed;

wherein, the way of setting the traffic shaping decision threshold includes: obtaining the maximum uplink bandwidth MaxUP of a network on which a terminal registers currently, and setting the decision threshold to be equal to 0.4-0.6 times of the MaxUP. Of course, the decision threshold is just a preferred value of the disclosure, and those skilled in the art can set the value flexibly within the MaxUP according to specific requirements;

wherein, the obtaining the maximum uplink bandwidth MaxUP of the network on which the terminal registers currently includes: when a PC drive is initialized, the maximum uplink bandwidth and the maximum downlink bandwidth of the network on which a board side SIM card registers currently through a control communication protocol of the PC drive and a UE board side. Furthermore, if the network registered changes, the UE side is also required to inform the PC drive initiatively, and report the maximum uplink bandwidth and the maximum downlink bandwidth of the current network registered.

Step 4: a data sending process is implemented in a normal way.

Step 5: a timer is set, and packet types are differentiated through a classifier (namely differentiating whether the packet is a data packet or an ACK acknowledgement packet).

Step 6: the data packet is sent to a data sending queue at a constant rate in timing time;

the specific implementation process of this step is: setting a uplink sending threshold $V'_T$, converting the $V'_T$ into a number of tokens as a value of a token bucket, when the data packet is sent, using a token bucket algorithm to control sending speed of the data packet; because the value of the token bucket is determined by a set uplink rate threshold, when the data packet is sent by using the token bucket algorithm, such a process of sending the data packet at the constant rate in a certain period of time is implemented; wherein, the $V'_T$ is required to be greater than the traffic shaping decision threshold, and the preferred $V'_T$ is required to be as great as possible, so as to provide the leeway of precisely downward adjusting the $V'_T$ subsequently.

Wherein, the working way of the token bucket algorithm is as follows: 1. the tokens are put into the bucket at a certain rate; 2. each token allows a source to send a certain number of bits; 3. when a packet is sent, a flow regulator deletes from the bucket the number of tokens which is equal to size of the packet; 4. if there is no enough token sending packet, then the packet waits until there are enough tokens or packets to be discarded, and it may be marked with a lower DSCP; 5. the bucket has a specific capacity; if the bucket is full, then the new added token is discarded. So, the maximum burst data volume which is sent from the source to the network is in direct proportion to the size of the bucket at any time. The token bucket allows burst, but it cannot exceed the limit.

Step 7: when the timing time is reached, sending the data packet is stopped, and all downlink ACK acknowledgement packets are directly sent to the data sending queue;

that is to say, because the downlink ACK acknowledgement packets occupy a few bandwidths, when each timer event comes, all the downlink ACK acknowledgement packets can be directly sent to the sending queue without being controlled by the token algorithm, thus the downlink ACK acknowledgement packets can be sent in time; however, a normal uplink data packet is different, after the timer event comes, sending the normal uplink data packet to the sending queue is stopped until the downlink ACK acknowledgement packets are processed completely.

Step 8: when the timing time is reached, the QoS module is called to obtain an average rate of the uplink channel in the timing time, calculate a ratio of the average value to a current uplink sending threshold $V'_T$, adjust the $V'_T$ in a direction that the ratio approaches 1 according to a set adjusting rule, and regard the adjusted $V'_T$ as a basis for setting the constant rate in next timing time.

In this step, the adjusting the $V'_T$ includes that:

in the embodiment of the disclosure, an optimal state of adjusting the $V'_T$ is that the ratio of the average rate to the $V'_T$ approaches 1 in the set timing time, so, in the subsequent adjustment, the $V'_T$ is adjusted in the direction that the ratio approaches 1.

To this, several ratio intervals are given in embodiments of the disclosure for differently adjusting the different ratios, which are specifically:

a ratio interval R1 approaching 1, which can be, but is not limited to 0.95-1;

a ratio interval R2 with too small ratios, which can be, but is not limited to 0-0.5;

multiple intervals Rx which are between the interval R1 and the interval R2 and connected in sequence; the specific standard of division can be defined according to requirements; for example, an interval R3 is 0.5-0.7, an interval R4 is 0.7-0.85, and an interval R5 is 0.85-0.95.

Wherein, for the interval R2, a corresponding adjusting step value can be set to be comparatively great, and an adjusting direction is towards reducing the $V'_T$; for a interval Rx, the closer to the interval R1 the Rx is, the smaller the adjusting step value of the interval Rx is, and the adjusting direction is towards reducing the $V'_T$.

To sum up, in this embodiment, the $V'_T$ is adjusted nonlinearly according to a result of the ratio of the average rate to the $V'_T$ in the set timing time, and the adjusted $V'_T$ is regarded as the basis for setting the constant rate in the next timing time.

Step 9: it is detected whether the adjusted $V'_T$ is in the interval R1; if so, the value of the $V'_T$ at the moment is regarded as an optimal upload bandwidth threshold, and the traffic shaping is stopped; otherwise, step 5 is returned.

Embodiment 4

Figure 6:
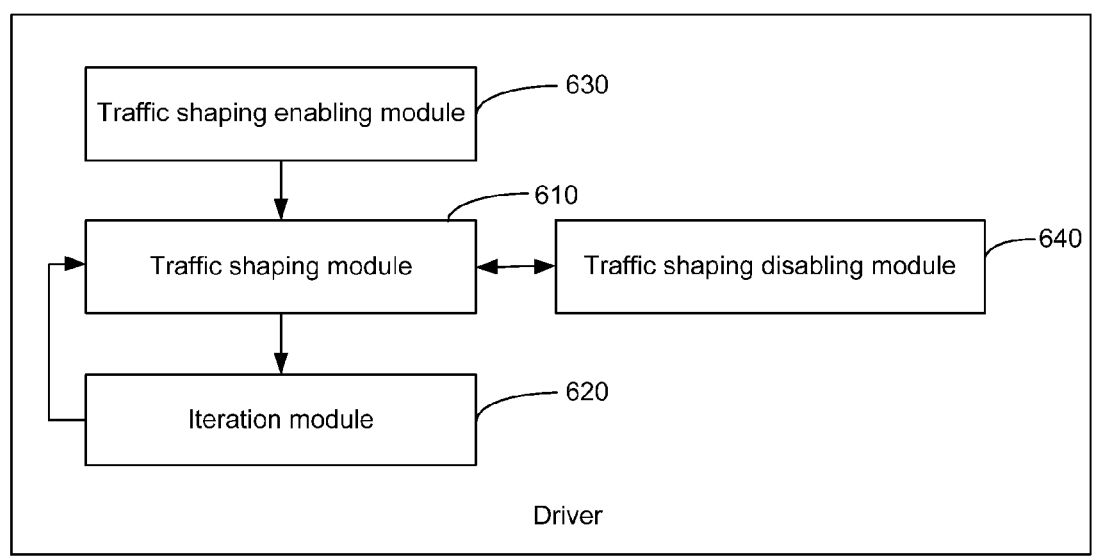
FIG. 6 is a structural diagram of a driver provided by the disclosure.

An embodiment provides a driver; as shown in FIG. 6, the driver includes:

the traffic shaping module 610, which is configured to set timing time, send a data packet in a cache queue at a preset constant rate in the timing time, and when the timing time is reached, stop sending the data packet, and start to send an ACK acknowledgement packet in the cache queue; and the iteration module 620, which is configured to, after the ACK acknowledgement packet is sent, continue to trigger the traffic shaping module 610.

Based on the above main structure, a few preferred solutions of the embodiment are given below for implementing this disclosure better.

Preferred solution 1: the driver of the embodiment further includes:

the traffic shaping enabling module 630, which is configured to call a QoS module to detect an average sending rate $\nabla$ of a data sending channel in a period of time which is from a previous specified time point to a current moment, when the $\nabla$ approaches or is greater than or equal to a preset traffic shaping decision threshold $V_T$, enable the traffic shaping module 610, and enable the traffic shaping function.

That is to say, the preferred solution adds the constraint for needing to conduct the traffic shaping; the traffic shaping is conducted only when the current rate meets a certain condition; otherwise, processing is implemented in a normal way. Wherein, the $V_T$ is less than a maximum bandwidth of the data sending channel; preferably, the $V_T$ is equal to 0.4-0.6 times of the maximum bandwidth of an uplink channel.

Preferred solution 2: in the embodiment, the traffic shaping module 610 sets a data packet sending threshold $V'_T$, converts the $V'_T$ into a number of tokens, and based on the number of tokens, sends the data packet according to a token bucket algorithm in the timing time to implement the sending data packet at the constant rate, wherein, $V'_T > V_T$.

Preferred solution 3: the driver of the embodiment further includes:

the traffic shaping module 610, which is configured to, when the timing time is reached, call a QoS module to detect an actual average sending rate $\nabla'$ of a data sending channel in this timing time, calculate a ratio of the $\nabla'$ to the $V'_T$, adjust the $V'_T$ in a direction that the ratio approaches 1 according to a set adjusting rule, and regard the adjusted $V'_T$ as a basis for setting the constant rate in next timing time.

Preferred solution 4: this solution is implemented based on the solution 3; the driver of the embodiment further includes:

the traffic shaping disabling module 640, which is configured to, when it is detected that the ratio of the actual average sending rate $\nabla'$ to the $V'_T$ is in a set interval range, disable the traffic shaping function; wherein the set interval range is a range approaching 1.

Combination modes of the above four preferred solutions include that: the preferred solution 1 is combined with the preferred solution 2, the preferred solutions 1, 2 and 3 are combined, and the preferred solutions 1, 2, 3 and 4 are combined.

To sum up, by conducting traffic shaping on a drive layer, this embodiment enables the data packet to be sent at the constant rate, and reserves a certain bandwidth to send the ACK acknowledgement packet in time, thereby avoiding network congestion caused by delayed sending the ACK acknowledgement packet, and improving user experience. Besides, considering that conducting the traffic shaping must limit the threshold of the corresponding bandwidth of the data sending channel, this embodiment also provides a solution of adaptively matching the threshold of the channel bandwidth; compared with the fixed threshold, this adaptively matching solution makes maximum use of the bandwidth of the data sending channel, enables a data packet sending speed to reach the limit of the bandwidth, and further improves the user experience.

The above is only the preferred embodiment of the disclosure and not intended to limit the scope of the claims of the disclosure.

INDUSTRIAL APPLICABILITY

By conducting traffic shaping on a drive layer, the disclosure enables a data packet to be sent at a constant rate, and reserves a certain bandwidth to send an ACK acknowledgement packet in time, thereby avoiding network congestion caused by delayed sending the ACK acknowledgement packet, and improving user experience.

What is claimed is:

1. A traffic shaping drive method, comprising:
   when traffic shaping is executed, setting timing time, and sending a data packet in a cache queue at a preset constant rate in the timing time; when the timing time is reached, stopping sending the data packet, and starting to send an ACK acknowledgement packet in the cache queue;
   after the ACK acknowledgement packet is sent, returning to execute the traffic shaping; and
   when executing the traffic shaping is enabled, detecting an average sending rate $\overline{V}$ of a data sending channel in a period of time which is from a previous specified time point to a current moment; when the $\overline{V}$ approaches or is greater than or equal to a preset traffic shaping decision threshold $V_T$, executing and enabling the traffic shaping.

2. The method according to claim 1, wherein the sending the data packet in the cache queue at the preset constant rate in the timing time comprises:
   setting a data packet sending threshold $V'_T$, converting the $V'_T$ into a number of tokens, and based on the number of tokens, sending the data packet according to a token bucket algorithm in the timing time to realize the sending data packet at the constant rate; wherein, $V'_T > V_T$.

3. The method according to claim 2, further comprising: when the timing time is reached,
   detecting an actual average sending rate $\overline{V'}$ of the data sending channel in this timing time, calculating a ratio of the $\overline{V'}$ to the $V'_T$, adjusting the $V'_T$ in a direction that the ratio approaches 1 according to a set adjusting rule, and regarding the adjusted $V'_T$ as a basis for setting the constant rate in next timing time.

4. The method according to claim 3, further comprising:
   when it is detected that the ratio of the actual average sending rate $\overline{V'}$ to the $V'_T$ is in a set interval range, disabling a traffic shaping function; wherein the set interval range is a range approaching 1.

5. A driver, comprising:
   a first processor, which is configured, when traffic shaping is executed, to set timing time, and to send a data packet in a cache queue at a preset constant rate in the timing time; and when the timing time is reached, to stop sending the data packet, and to start to send an ACK acknowledgement packet in the cache queue;
   a second processor, which is configured, after the ACK acknowledgement packet is sent, to continue to trigger the first processor; and
   a third processor, which is configured to call a fourth processor to detect an average sending rate $\overline{V}$ of a data sending channel in a period of time which is from a previous specified time point to a current moment; when the $\overline{V}$ approaches or is greater than or equal to a preset traffic shaping decision threshold $V_T$, to enable the first processor, and to enable the traffic shaping.

6. The driver according to claim 5, wherein the first processor is further configured to set a data packet sending threshold $V'_T$, to convert the $V'_T$ into a number of tokens, and based on the number of tokens, to send the data packet according to a token bucket algorithm in the timing time to realize the sending data packet at the constant rate; wherein, $V'_T > V_T$.

7. The driver according to claim 6, wherein the first processor is further configured, when the timing time is reached, to call the fourth processor to detect an actual average sending rate $\overline{V'}$ of the data sending channel in this timing time, to calculate a ratio of the $\overline{V'}$ to the $V'_T$, to adjust the $V'_T$ in a direction that the ratio approaches 1 according to a set adjusting rule, and to regard the adjusted $V'_T$ as a basis for setting the constant rate in next timing time.

8. The driver according to claim 7, further comprising:
   a fifth processor, which is configured, when it is detected that the ratio of the actual average sending rate $\overline{V'}$ to the $V'_T$ is in a set interval range, to disable a traffic shaping function; wherein the set interval range is a range approaching 1.

* * * * *